US 11,214,185 B2

(12) United States Patent
Qiu et al.

(10) Patent No.: US 11,214,185 B2
(45) Date of Patent: Jan. 4, 2022

(54) ELECTRIC VEHICLE

(71) Applicant: TOYOTA JIDOSHA KABUSHIKI KAISHA, Toyota (JP)

(72) Inventors: Zekai Qiu, Nisshin (JP); Hironobu Kitaoka, Nisshin (JP); Naoki Yamamuro, Nagoya (JP); Kozo Kosho, Toyota (JP); Hiroaki Sugiyama, Nagoya (JP); Makoto Ikegami, Obu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 299 days.

(21) Appl. No.: 16/164,131

(22) Filed: Oct. 18, 2018

(65) Prior Publication Data

US 2019/0118692 A1 Apr. 25, 2019

(30) Foreign Application Priority Data

Oct. 20, 2017 (JP) .............................. JP2017-203743

(51) Int. Cl.

| B60R 5/02 | (2006.01) |
| B60N 3/10 | (2006.01) |
| B60L 50/50 | (2019.01) |
| B60L 1/02 | (2006.01) |
| B60K 1/00 | (2006.01) |

(Continued)

(52) U.S. Cl.
CPC ................ *B60N 3/104* (2013.01); *B60K 1/00* (2013.01); *B60K 1/04* (2013.01); *B60L 1/02* (2013.01); *B60L 3/0007* (2013.01); *B60L 50/50* (2019.02); *B60R 5/02* (2013.01); *B60R 11/00* (2013.01); *B60K 2001/0438* (2013.01); *B60R 2011/0036* (2013.01); *B60Y 2306/01* (2013.01); *B60Y 2306/05* (2013.01)

(58) Field of Classification Search
CPC .. B60N 3/104; B60R 5/02; B60R 5/04; B60R 5/00
USPC .................................. 296/37.1, 37.16, 24.35
See application file for complete search history.

(56) References Cited

U.S. PATENT DOCUMENTS

| 1,938,141 A | 12/1933 | Goldkind |
| 2,822,056 A * | 2/1958 | Muller ................... B62D 49/08 |
| | | 180/291 |

(Continued)

FOREIGN PATENT DOCUMENTS

| CN | 202088909 U | 12/2011 |
| DE | 2901920 A1 | 8/1980 |

(Continued)

OTHER PUBLICATIONS

Teslarati. Tesla Model S Front Truck (Frunk) Electric Cooler Review, (Jan. 31, 2014), Teslarati.com, 6 pages.

*Primary Examiner* — Joseph D. Pape
(74) *Attorney, Agent, or Firm* — Hunton Andrews Kurth LLP

(57) ABSTRACT

An electric vehicle includes: a vehicle main body; and a cooling box provided in the vehicle main body. A passenger compartment in which a passenger gets, and a front accommodation compartment provided more frontward than the passenger compartment are formed in the vehicle main body. The cooling box is disposed in the front accommodation compartment. Thus, the cooling box mounted on the electric vehicle can be easily accessed even when the electric vehicle is parked reversely.

9 Claims, 9 Drawing Sheets

(51) Int. Cl.
*B60L 3/00* (2019.01)
*B60R 11/00* (2006.01)
*B60K 1/04* (2019.01)

(56) References Cited

U.S. PATENT DOCUMENTS

| | | | | |
|---|---|---|---|---|
| 2,902,838 | A | * | 9/1959 | Nichols ................ B60N 3/104 |
| | | | | 62/244 |
| 3,004,790 | A | | 10/1961 | Mayer |
| 4,103,510 | A | * | 8/1978 | Hall ..................... B60H 1/005 |
| | | | | 62/243 |
| 4,765,151 | A | | 8/1988 | Bessey |
| 4,936,103 | A | * | 6/1990 | Newman ............... B60N 3/104 |
| | | | | 211/186 |
| 5,598,962 | A | | 2/1997 | Schlachter |
| 6,598,914 | B1 | | 7/2003 | Dixon |
| 6,921,492 | B2 | | 7/2005 | De Gaillard |
| 7,891,203 | B1 | * | 2/2011 | Burns .................... B60N 3/104 |
| | | | | 62/115 |
| 10,195,999 | B1 | * | 2/2019 | Glickman ............ B62D 25/105 |
| 2007/0186573 | A1 | * | 8/2007 | Ziehr ................... B60H 1/3222 |
| | | | | 62/236 |

FOREIGN PATENT DOCUMENTS

| | | |
|---|---|---|
| DE | 102013226457 A1 | 6/2015 |
| FR | 2816699 A1 | 5/2002 |
| JP | S61054331 A | 3/1986 |
| JP | H06065026 U | 9/1994 |
| JP | 2001260741 A | 9/2001 |
| JP | 2002-206838 A | 7/2002 |
| JP | 2008213774 A | 9/2008 |
| JP | 2014121206 A | 6/2014 |
| KR | 1020010058915 A | 7/2001 |

* cited by examiner

ELECTRIC VEHICLE

This nonprovisional application is based on Japanese Patent Application No. 2017-203743 filed on Oct. 20, 2017 with the Japan Patent Office, the entire contents of which are hereby incorporated by reference.

BACKGROUND

Field

The present disclosure relates to an electric vehicle.

Description of the Background Art

A van-type vehicle described in Japanese Patent Laying-Open No. 2002-206838 includes a driver's seat, a general baggage loading compartment, and a vehicle-mounted refrigerator. The general baggage loading compartment is disposed on the rear side of the driver's seat.

SUMMARY

When a vehicle is stopped, the vehicle is generally parked reversely in many cases such that a rear wheel comes into contact with a wheel stopper. When the vehicle is parked reversely, another vehicle may be parked next to the vehicle or there may be an obstacle such as a fence.

In such a case, the refrigerator is disposed more rearward than the driver's seat in the above-described van-type vehicle, and thus, it is difficult to put baggage on the refrigerator and take baggage down from the refrigerator.

The present disclosure has been made in light of the above-described problem, and an object of the present disclosure is to provide an electric vehicle in which a cooling box mounted on the electric vehicle can be easily accessed even when the electric vehicle is parked reversely.

An electric vehicle according to the present disclosure includes: a vehicle main body; and a cooling box provided in the vehicle main body. A passenger compartment in which a passenger gets, and a front accommodation compartment provided more frontward than the passenger compartment are formed in the vehicle main body, and the cooling box is disposed in the front accommodation compartment. According to the above-described electric vehicle, an object to be accommodated can be easily put into the cooling box when the electric vehicle is parked reversely.

The electric vehicle further includes a first front wheel and a second front wheel provided more frontward than a center of the vehicle main body and arranged each other in a width direction of the vehicle main body. The cooling box is disposed between the first front wheel and the second front wheel.

According to the above-described electric vehicle, damage of the cooling box can be suppressed even when the electric vehicle receives side collision.

The cooling box is located closer to the passenger compartment than a front end of the vehicle main body, a door configured to open and close the cooling box is provided on a side surface of the cooling box located on the passenger compartment side, and the door is disposed in the passenger compartment. According to the above-described electric vehicle, an object accommodated in the cooling box can be taken out from the passenger compartment.

The cooling box is disposed at a center in a width direction of the vehicle main body. According to the above-described electric vehicle, the weight balance of the electric vehicle in the width direction can be kept.

The vehicle main body includes a first side surface and a second side surface arranged in a width direction, and the cooling box is disposed on the first side surface side with respect to a center in the width direction of the vehicle main body. According to the above-described electric vehicle, an object to be accommodated can be put into the cooling box from the side surface side of the vehicle.

The electric vehicle further includes a cooling circuit configured to cool air in the passenger compartment and air in the cooling box, wherein when the front accommodation compartment is viewed from above in a plan view, at least a part of the cooling circuit is located in the front accommodation compartment.

According to the above-described electric vehicle, a distance between the cooling circuit and the cooling box is short, and thus, the air in the cooling box can be efficiently cooled.

The electric vehicle further includes a rear-side cooling box, wherein a rear accommodation compartment located more rearward than the passenger compartment is formed in the vehicle main body, and the rear-side cooling box is disposed in the rear accommodation compartment. Food and the like can also be stored in the rear-side cooling box.

The vehicle main body includes a roof provided so as to close an upper part of the front accommodation compartment, the roof includes a roof main body and a divided roof, and the divided roof is provided on the vehicle main body and is disposed on a portion of the front accommodation compartment located above the cooling box.

According to the above-described electric vehicle, by opening the divided roof, an object to be accommodated can be put into the cooling box.

The foregoing and other objects, features, aspects and advantages of the present disclosure will become more apparent from the following detailed description of the present disclosure when taken in conjunction with the accompanying drawings.

DESCRIPTION OF THE PREFERRED EMBODIMENTS

First Embodiment

Figure 1:
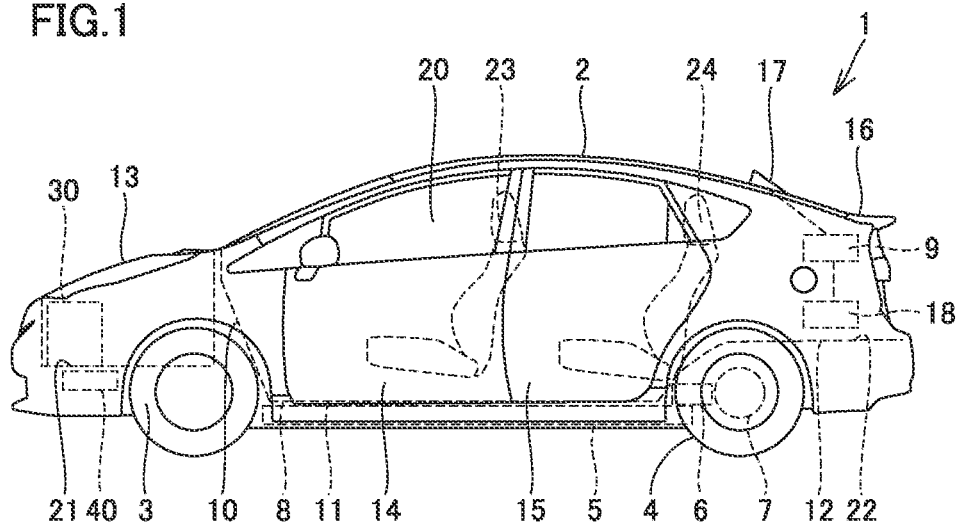
FIG. 1 is a block diagram schematically showing an electric vehicle 1.

An electric vehicle according to a first embodiment will be described with reference to FIGS. 1 to 15. The same or substantially the same components, of the components shown in FIGS. 1 to 15, are denoted by the same reference characters and redundant description will not be repeated.

FIG. 1 is a block diagram schematically showing an electric vehicle 1. Electric vehicle 1 includes a vehicle main body 2, a front wheel 3, a rear wheel 4, a battery 5, a PCU 6, a motor 7, an ECU 9, a communication device 17, a storage 18, a cooling box 30, and a cooling circuit 40.

Front wheel 3 is provided more frontward than a center in a front-back direction of electric vehicle 1. Rear wheel 4 is provided more rearward than the center in the front-back direction of electric vehicle 1. Battery 5 is provided on a bottom surface of electric vehicle 1. PCU 6 and motor 7 are provided near rear wheel 4.

Communication device 17 is configured to be capable of communicating with the outside. For example, communication device 17 is configured to be capable of receiving a signal from a not-shown server and the like. Various types of information are stored in storage 18.

Vehicle main body 2 includes a floor panel 8, a roof 13, a front door 14, a rear door 15, and a back hatch 16. A passenger compartment 20, a front accommodation compartment 21 and a rear accommodation compartment 22 are formed in vehicle main body 2.

A front seat 23 and a rear seat 24 are disposed in passenger compartment 20. Passenger compartment 20 is a space in which a passenger such as a driver gets.

Front accommodation compartment 21 is formed more frontward of electric vehicle 1 than passenger compartment 20. Front accommodation compartment 21 is formed to be open upwardly. Rear accommodation compartment 22 is provided more rearward than passenger compartment 20. Specifically, rear accommodation compartment 22 is formed on the rear side of rear seat 24.

Floor panel 8 includes a partition wall 10, a center floor panel 11 and a rear floor panel 12.

Partition wall 10 is a wall that partitions front accommodation compartment 21 and passenger compartment 20. Center floor panel 11 is a panel that forms a bottom surface of passenger compartment 20. Rear floor panel 12 is a panel that forms a bottom surface of rear accommodation compartment 22.

Battery 5, PCU 6 and motor 7 are provided on a lower surface of floor panel 8, and specifically, battery 5 is provided on a lower surface of center floor panel 11. Roof 13 is provided on vehicle main body 2 so as to be capable of opening and closing an opening of front accommodation compartment 21. Front door 14 and rear door 15 are pivotably provided on vehicle main body 2. When front door 14 and rear door 15 are opened, a passenger can enter and exit passenger compartment 20.

Back hatch 16 is provided at a rear end of electric vehicle 1 in an openable and closable manner. When back hatch 16 is opened, rear accommodation compartment 22 can be opened.

Figure 2:
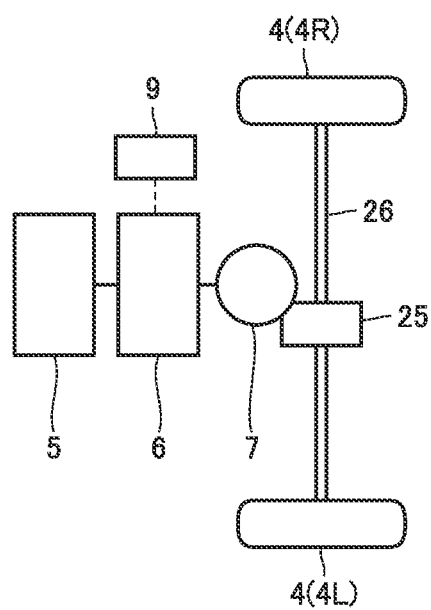
FIG. 2 is a block diagram schematically showing devices for causing electric vehicle 1 to travel.

FIG. 2 is a block diagram schematically showing devices for causing electric vehicle 1 to travel. Electric vehicle 1 includes an ECU (Electronic Control Unit) 9, a transmission 25 and an axle 26.

Axle 26 is connected to a left rear wheel 4L and a right rear wheel 4R. Transmission 25 is mechanically connected to motor 7 and axle 26.

When electric vehicle 1 travels, DC power from battery 5 is supplied to PCU (Power Control Unit) 6. PCU 6 boosts a voltage of the DC power supplied from battery 5, and further converts the DC power to AC power and supplies the AC power to motor 7. Motor 7 drives left rear wheel 4L and right rear wheel 4R using the supplied AC power. As described above, the vehicle according to the present embodiment is an electric vehicle.

Figure 3:
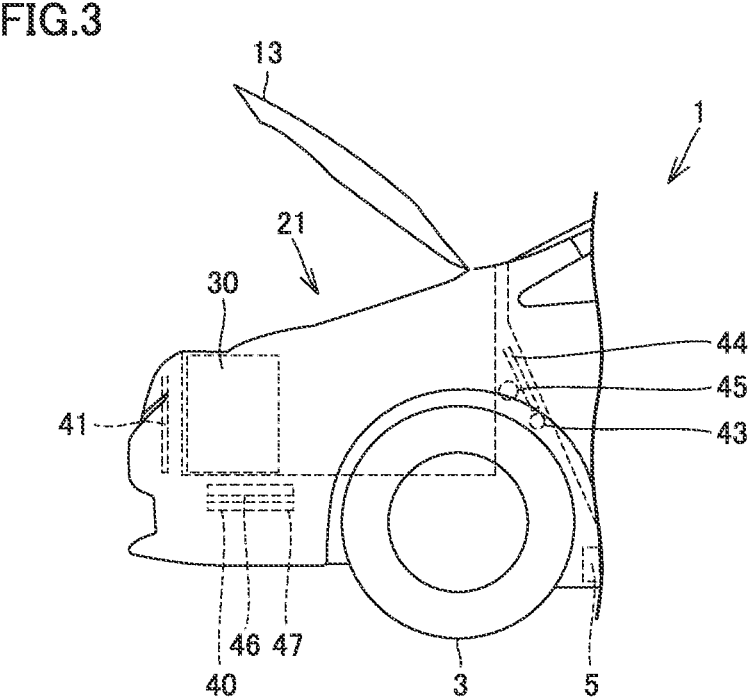
FIG. 3 is a side view showing a front accommodation compartment 21 and its surroundings.

FIG. 3 is a side view showing front accommodation compartment 21 and its surroundings. Roof 13 is provided so as to be pivotable with respect to vehicle main body 2, and when roof 13 is opened, front accommodation compartment 21 is opened.

Figure 4:
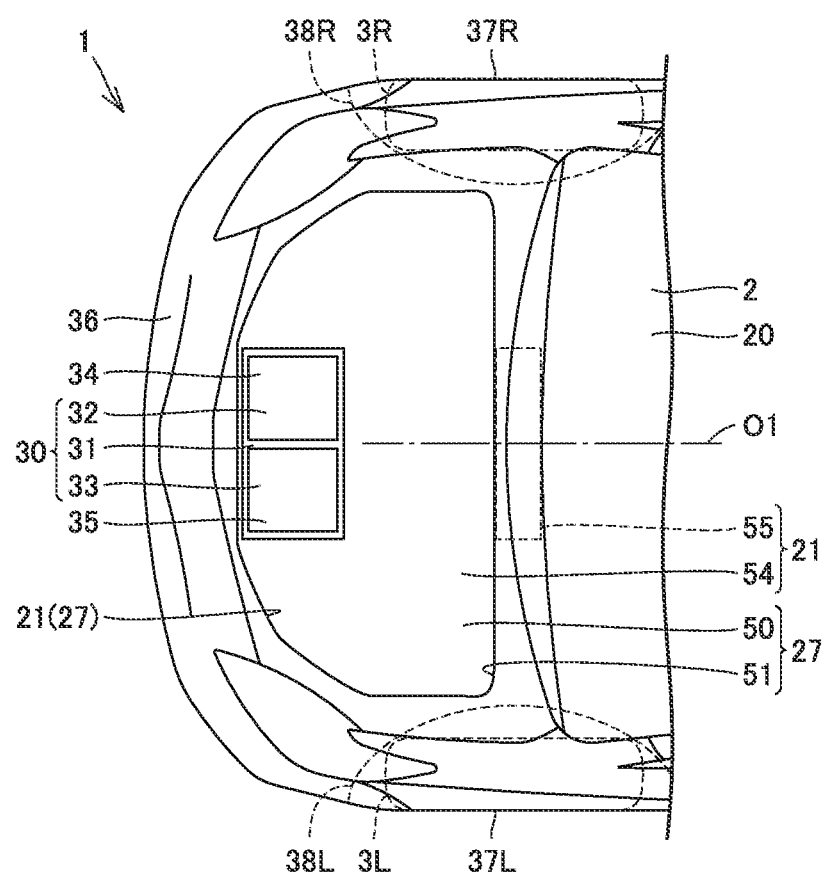
FIG. 4 is a plan view when front accommodation compartment 21 is viewed from above in a plan view.
Figure 5:
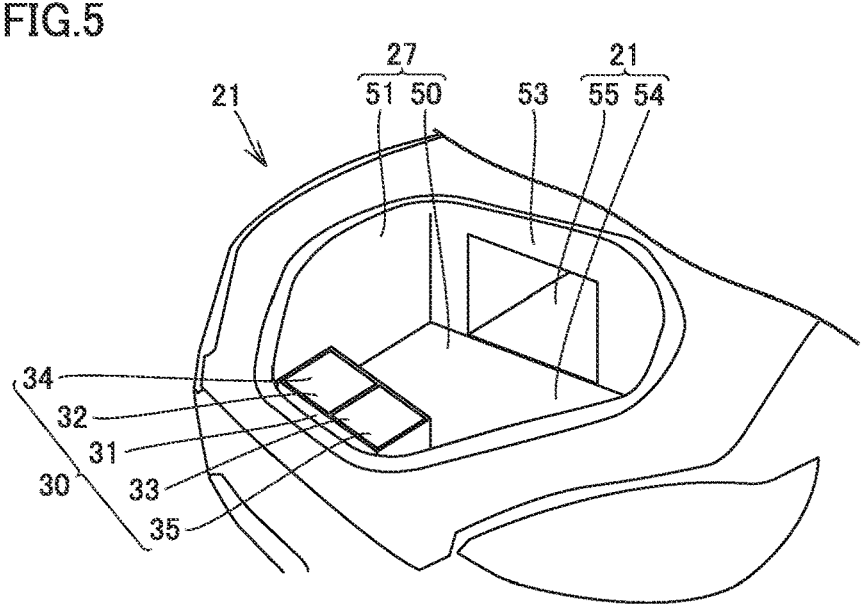
FIG. 5 is a perspective view schematically showing front accommodation compartment 21.

FIG. 4 is a plan view when front accommodation compartment 21 is viewed from above in a plan view. FIG. 5 is a perspective view schematically showing front accommodation compartment 21. Roof 13 is not shown in FIGS. 4 and 5.

In FIG. 4, electric vehicle 1 includes right and left side surfaces 37R and 37L arranged in a width direction of electric vehicle 1, a front surface 36 located at a front end of electric vehicle 1, and right and left front wheels 3R and 3L. Right front wheel 3R and left front wheel 3L are provided so as to be arranged in the width direction of electric vehicle 1.

Right side surface 37R is provided with a tire house 38R that covers right front wheel 3R, and left side surface 37L is provided with a tire house 38L that covers left front wheel 3L.

Front accommodation compartment 21 is formed by a housing 27. Housing 27 is disposed between passenger compartment 20 and front surface 36 and between right side surface 37R and left side surface 37L. In FIG. 5, front accommodation compartment 21 includes a main accommodation compartment 54 and a sub accommodation compartment 55.

Sub accommodation compartment 55 is formed between main accommodation compartment 54 and passenger compartment 20, and is formed so as to extend from main accommodation compartment 54 toward the rear side of electric vehicle 1. Housing 27 includes a bottom plate 50 and a peripheral wall 51. Peripheral wall 51 includes a rear wall portion 53 located on the passenger compartment 20 side. Sub accommodation compartment 55 is formed so as to extend from rear wall portion 53 toward the rear side of electric vehicle 1.

Cooling box 30 is provided in front accommodation compartment 21. In the example shown in FIG. 4, cooling box 30 is disposed in main accommodation compartment 54 of front accommodation compartment 21. Cooling box 30 is disposed at the center in the width direction of electric vehicle 1. A center line O1 is an imaginary line passing through the center in the width direction of electric vehicle 1. When front accommodation compartment 21 and cooling box 30 are viewed in a plan view, cooling box 30 overlaps with center line O1.

Cooling box 30 is disposed on the front surface 36 side with respect to passenger compartment 20. Specifically, peripheral wall 51 of housing 27 includes a front-side wall located on the front surface 36 side, and cooling box 30 is disposed on the front-side wall.

Cooling box 30 includes a main body 31 and lids 32 and 33. A refrigerating compartment 34 and a freezing compartment 35 are formed in main body 31.

Although cooling box 30 has both the refrigerating function and the freezing function in the present embodiment, cooling box 30 may include one of the refrigerating function and the freezing function. Refrigerating compartment 34 and freezing compartment 35 are both formed so as to be open upwardly. Lid 32 is provided on main body 31 so as to open and close an opening of refrigerating compartment 34. Lid 33 is provided on main body 31 so as to open and close an opening of freezing compartment 35.

Figure 6:
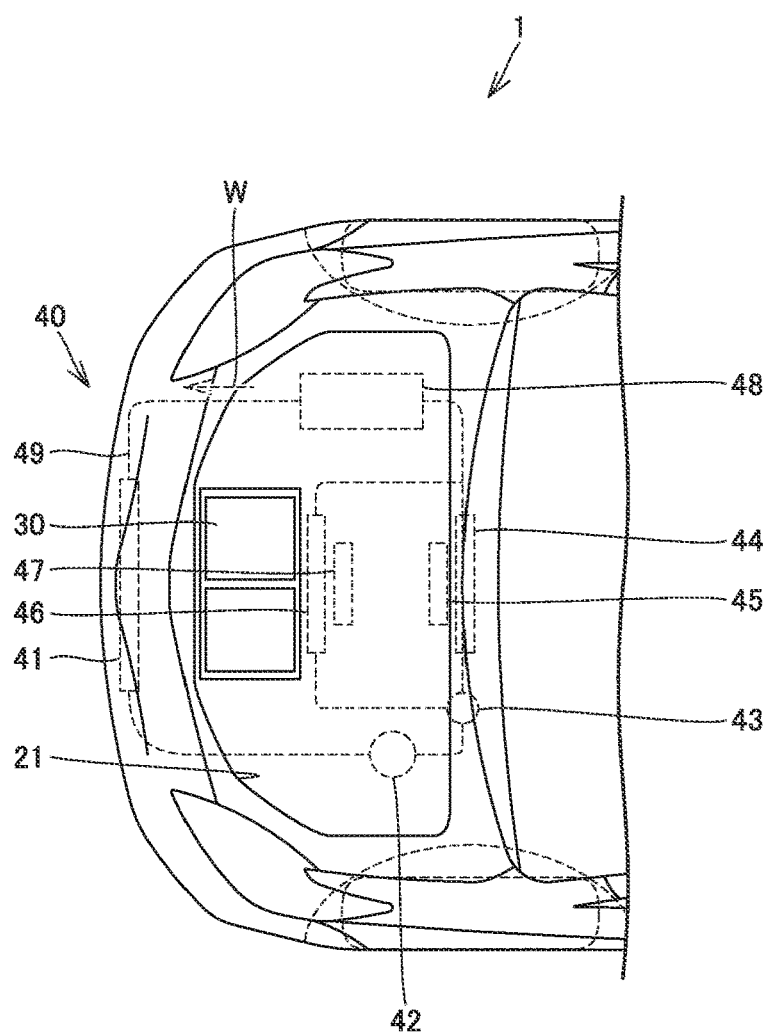
FIG. 6 is a plan view showing a cooling circuit 40.

FIG. 6 is a plan view showing cooling circuit 40. Cooling circuit 40 includes a condenser 41, a gas-liquid separator 42, an expansion valve 43, an evaporator 44, a blower 45, an evaporator 46, a blower 47, a compressor 48, a refrigerant pipe 49, and a refrigerant W.

Refrigerant pipe 49 sequentially connects condenser 41, gas-liquid separator 42, expansion valve 43, evaporators 44 and 46, and compressor 48. Furthermore, refrigerant W flows through refrigerant pipe 49.

Condenser 41 cools refrigerant W using the outdoor air. Gas-liquid separator 42 separates refrigerant W flowing through refrigerant pipe 49 into refrigerant W in a gas state and refrigerant W in a liquid state, and supplies refrigerant W in a liquid state to expansion valve 43. Expansion valve 43 adiabatically expands refrigerant W and supplies refrigerant W in a mist state to evaporators 44 and 46.

Blower 45 blows the air in passenger compartment 20 on evaporator 44 to thereby cool the air. The cooled air is supplied into passenger compartment 20.

Blower 47 blows the air in cooling box 30 on evaporator 46 to thereby cool the air in cooling box 30. The cooled air in cooling box 30 passes through ducts and returns to cooling box 30. Specifically, the ducts are connected to both refrigerating compartment 34 and freezing compartment 35, and the air cooled by evaporator 46 is supplied to refrigerating compartment 34 and freezing compartment 35 through the respective ducts. A damper is provided in each duct, and ECU 9 adjusts the degree of opening of each damper, thereby adjusting the temperature in refrigerating compartment 34 and the temperature in freezing compartment 35.

Refrigerant W having flown through evaporators 44 and 46 is supplied to compressor 48. In compressor 48, refrigerant W compresses to high-temperature and high-pressure refrigerant. Refrigerant W is supplied from compressor 48 to condenser 41 and cooled in condenser 41.

In the example shown in FIG. 6, cooling circuit 40 cools both the air in passenger compartment 20 and the air in cooling box 30. Therefore, the overall size of the cooling circuit can be reduced, as compared with the case of separately providing a cooling circuit for cooling the air in passenger compartment 20 and a cooling circuit for cooling the air in cooling box 30.

When cooling circuit 40 and front accommodation compartment 21 are viewed in a plan view, a plurality of devices forming cooling circuit 40 are disposed on the lower side of front accommodation compartment 21. Therefore, a distance between cooling box 30 provided in cooling circuit 40 and cooling circuit 40 is short, and thus, the air in cooling box 30 can be efficiently cooled. Specifically, when front accommodation compartment 21 and cooling circuit 40 are viewed in a plan view, gas-liquid separator 42, evaporator 46 and compressor 48 are located on the lower side of front accommodation compartment 21.

Figure 7:
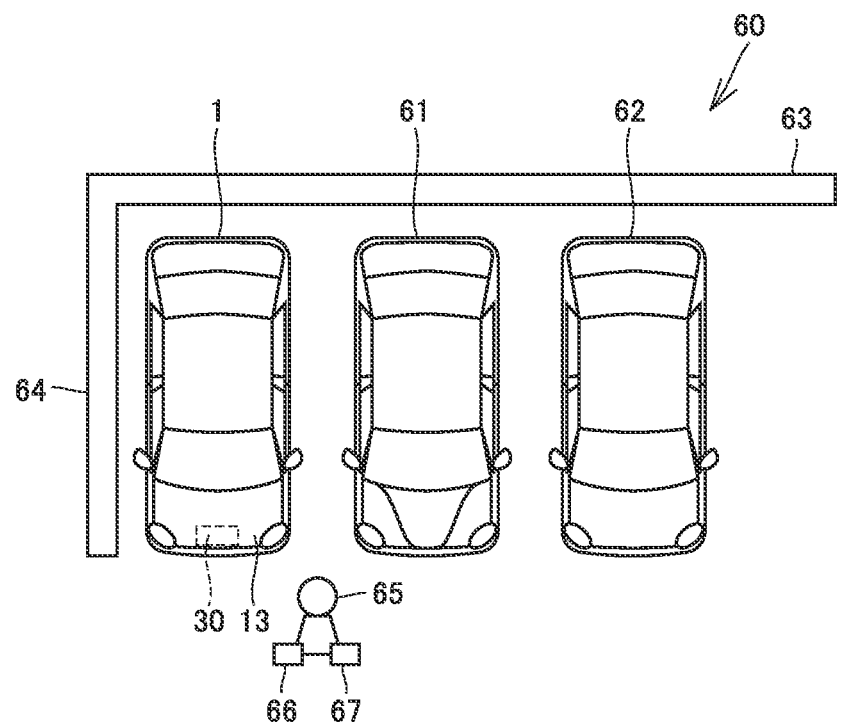
FIG. 7 is a plan view showing a state in which electric vehicle 1 is parked in a parking lot.

FIG. 7 is a plan view showing a state in which electric vehicle 1 is parked in a parking lot. In the state shown in FIG. 7, electric vehicle 1 and vehicles 61 and 62 are parked in a parking lot 60.

Electric vehicle 1 and vehicles 61 and 62 are all parked reversely. Parking lot 60 is provided with a wall 63 and a wall 64. Wall 63 is disposed on the rear side of electric vehicle 1 and vehicles 61 and 62, and wall 64 is disposed so as to be adjacent to electric vehicle 1.

When a user 65 of electric vehicle 1 puts refrigerated food 66 and frozen food 67 into cooling box 30, user 65 opens roof 13. Since roof 13 and front accommodation compartment 21 are located on the front side of passenger compartment 20, user 65 can easily open roof 13.

As a result, user 65 can easily put refrigerated food 66 and frozen food 67 into cooling box 30. As described above, even when there is an obstacle such as another vehicle or a wall on the right and left side and on the rear side of electric vehicle 1, refrigerated food 66 and frozen food 67 can be easily put into cooling box 30.

Particularly, cooling box 30 is disposed on the front surface 36 side, and thus, user 65 can easily put food and the like into cooling box 30.

In electric vehicle 1 according to the first embodiment described above, cooling box 30 is provided more frontward than passenger compartment 20 and battery 5. Therefore, when electric vehicle 1 receives front collision, cooling box 30 can function as an impact absorbing member to thereby reduce the impact force applied to front accommodation compartment 21 and battery 5.

Since cooling box 30 is disposed at the center in the width direction of electric vehicle 1, disturbance of the weight balance of electric vehicle 1 in the right and left direction is suppressed.

Second Embodiment

Figure 8:
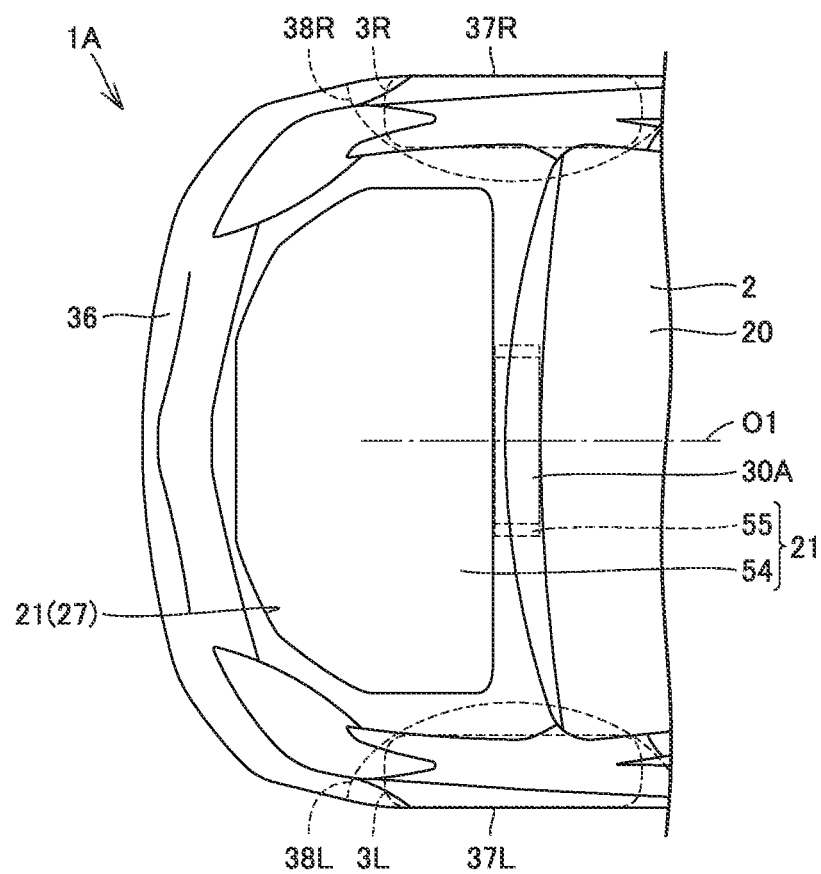
FIG. 8 is a plan view schematically showing a cooling box 30A and front accommodation compartment 21.
Figure 9:
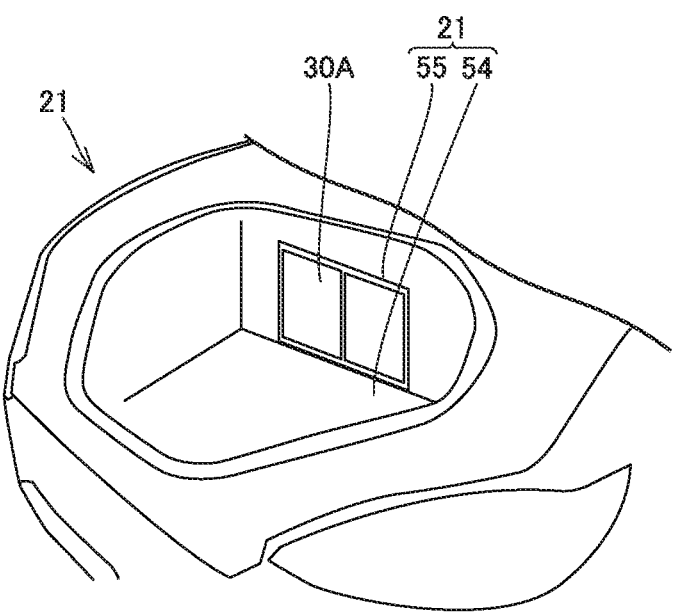
FIG. 9 is a perspective view schematically showing cooling box 30A and front accommodation compartment 21.

An electric vehicle 1A according to a second embodiment will be described with reference to FIGS. 8 and 9. FIG. 8 is a plan view schematically showing a cooling box 30A and front accommodation compartment 21. FIG. 9 is a perspective view schematically showing cooling box 30A and front accommodation compartment 21.

In electric vehicle 1A, cooling box 30A is accommodated in sub accommodation compartment 55 of front accommodation compartment 21. Cooling box 30A is disposed between left front wheel 3L and right front wheel 3R. Therefore, for example, even when electric vehicle 1A receives side collision, damage of cooling box 30A can be suppressed. Cooling box 30A is located closer to passenger compartment 20 than front surface 36 of electric vehicle 1A.

Figure 10:
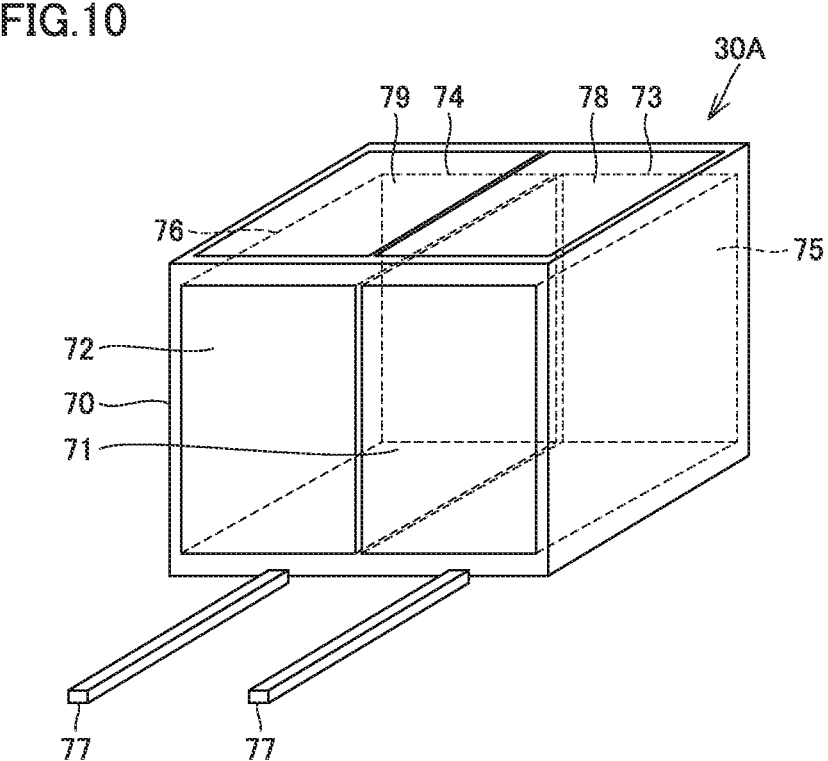
FIG. 10 is a perspective view schematically showing cooling box 30A.

FIG. 10 is a perspective view schematically showing cooling box 30A. Cooling box 30A includes a main body 70 and doors 71, 72, 73, 74, 78, and 79. A refrigerating compartment 75 and a freezing compartment 76 are formed in main body 70.

Doors 71 and 72 are located in front accommodation compartment 21, and doors 73 and 74 are located in passenger compartment 20. Doors 73 and 74 are provided on a portion of a perimeter surface of cooling box 30A located on the passenger compartment 20 side. Doors 73 and 74 are disposed in passenger compartment 20.

Therefore, by opening doors 71 and 72 from the front accommodation compartment 21 side, various types of food and the like can be put into refrigerating compartment 75 and freezing compartment 76, and by opening doors 73 and 74 from the passenger compartment 20 side, various types of food and the like can be taken out from refrigerating compartment 75 and freezing compartment 76. Door 78 is provided on an upper surface of refrigerating compartment 75. Door 79 is provided on an upper surface of freezing compartment 76.

In electric vehicle 1A as well, cooling box 30A is accommodated in front accommodation compartment 21, and thus, user 65 can easily put refrigerated food 66, frozen food 67 and the like into cooling box 30A when electric vehicle 1A is parked reversely. Furthermore, cooling box 30A is disposed at a center in a width direction of electric vehicle 1A, and thus, the weight balance of electric vehicle 1A in the right and left direction is kept.

Cooling box 30A is configured to be slidable in a front-back direction of electric vehicle 1A. Specifically, a rail 77 is provided on a bottom surface of front accommodation compartment 21 and cooling box 30A can be pulled out along rail 77. As a result, when user 65 puts food and the like into cooling box 30A, user 65 can pull out cooling box 30A and then open doors 78 and 79 to thereby put food and the like into cooling box 30A.

Third Embodiment

Figure 11:
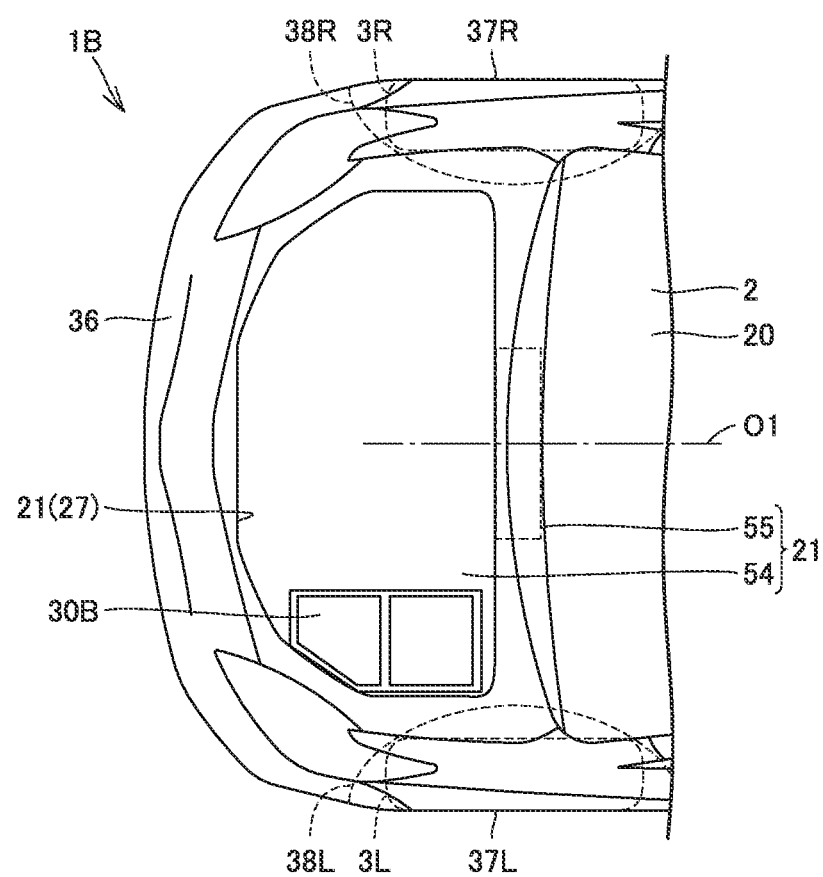
FIG. 11 is a plan view schematically showing a part of an electric vehicle 1B.
Figure 12:
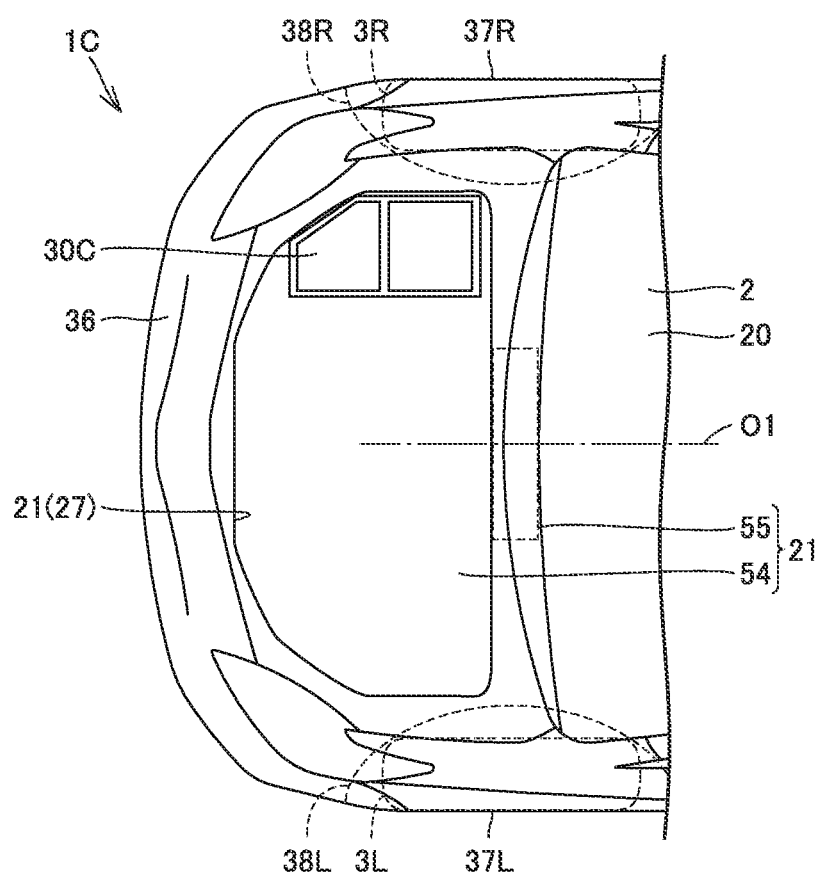
FIG. 12 is a plan view schematically showing a part of an electric vehicle 1C according to a modification.

Electric vehicles 1B and 1C according to a third embodiment will be described with reference to FIGS. 11 and 12. FIG. 11 is a plan view schematically showing a part of electric vehicle 1B. In electric vehicle 1B, a cooling box 30B is located closer to left side surface 37L than a center in a width direction of vehicle main body 2. FIG. 12 is a plan view schematically showing a part of electric vehicle 1C according to a modification. In electric vehicle 1C, a cooling box 30C is located closer to right side surface 37R than a center in a width direction of vehicle main body 2. As described above, the cooling box may be disposed on the side surface side of the electric vehicle.

Also in electric vehicles 1B and 1C configured as described above, cooling boxes 30B and 30C are disposed in front accommodation compartment 21, and thus, refrigerated food, frozen food and the like can be easily put into the cooling box.

Fourth Embodiment

Figure 13:
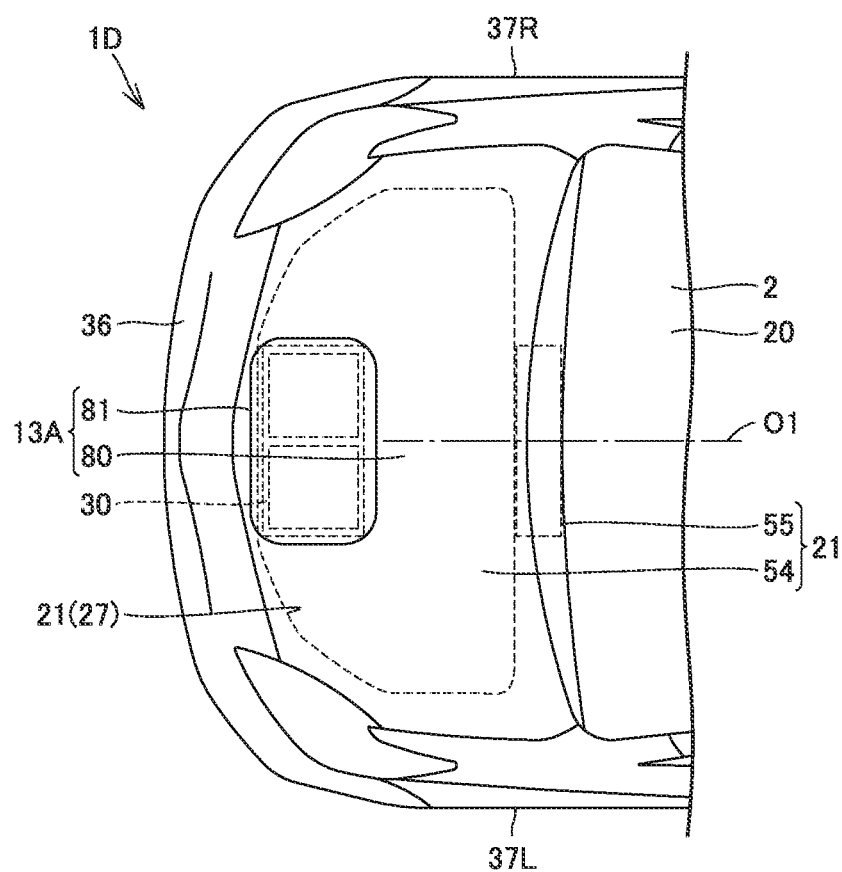
FIG. 13 is a plan view showing a roof 13A and the like provided in an electric vehicle 1D according to a fourth embodiment.
Figure 14:
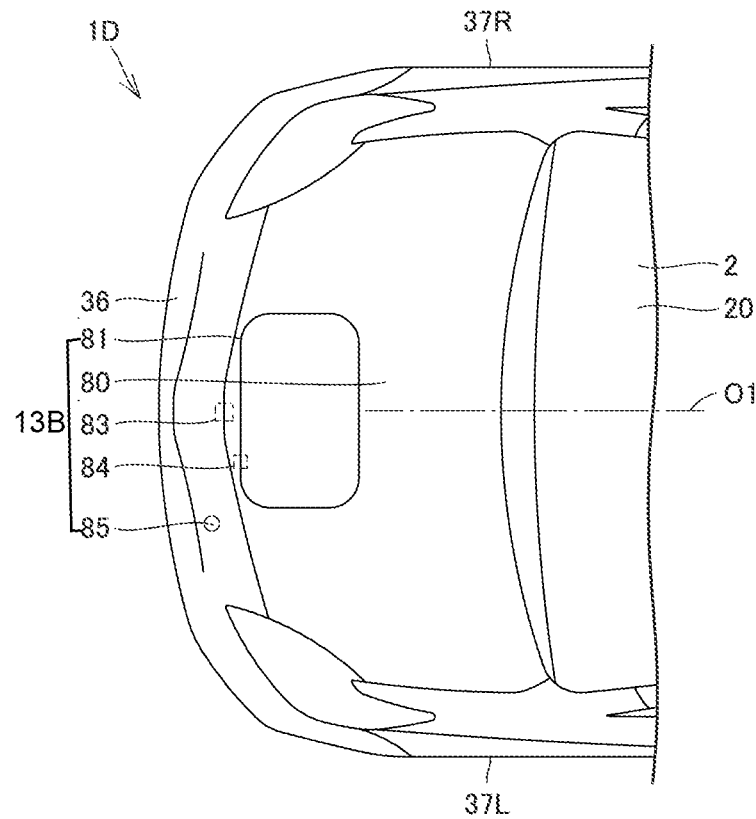
FIG. 14 is a plan view showing a roof 13B which is a modification of roof 13A.

Roof 13 will be described with reference to FIGS. 13 and 14. FIG. 13 is a plan view showing a roof 13A and the like provided in an electric vehicle 1D according to a fourth embodiment. In the modification shown in FIG. 13, roof 13A includes a roof main body 80 and a divided roof 81.

Divided roof 81 is provided on roof main body 80 in a pivotable manner. On the other hand, when roof main body 80 is pivoted, divided roof 81 rotates together with roof main body 80.

Divided roof 81 is located above cooling box 30. Even when divided roof 81 is opened, a portion of front accommodation compartment 21 located below roof main body 80 cannot be accessed.

In the case of using such roof 13A, only divided roof 81 is opened when food and the like are put into cooling box 30, and thus, food and the like can be put into cooling box 30. Since a weight of divided roof 81 is lighter than a weight of entire roof 13A, divided roof 81 can be easily opened and the convenience can be improved.

Although divided roof 81 is provided integrally with roof main body 80 in the example shown in FIG. 13, divided roof 81 and roof main body 80 may be completely independent of each other. In this case, even when roof main body 80 is opened, divided roof 81 remains in a closed state. FIG. 14 is a plan view showing a roof 13B which is a modification of roof 13A.

Roof 13B includes roof main body 80, divided roof 81, locking devices 83 and 84, and a communication device 85.

Divided roof 81 is provided independently of roof main body 80. Therefore, even when roof main body 80 is opened, divided roof 81 remains in a closed state, and even when divided roof 81 is opened, roof main body 80 remains in a closed state.

Divided roof 81 is located above cooling box 30, and by opening divided roof 81, food and the like can be put into cooling box 30. On the other hand, even when divided roof 81 is opened, a portion of front accommodation compartment 21 located below roof main body 80 cannot be accessed.

Based on a command from ECU 9, locking device 83 switches between a state in which roof main body 80 is locked and a state in which roof main body 80 is unlocked. Based on a command from ECU 9, locking device 84 switches between a state in which divided roof 81 is locked and a state in which divided roof 81 is unlocked.

Communication device 85 is configured to be capable of communicating with the outside. For example, communication device 85 is configured to be capable of receiving radio waves having a plurality of frequency bands. For example, communication device 85 is configured to be capable of receiving a radio wave transmitted from a key carried by user 65, and is further configured to be capable of receiving a radio wave having a frequency band such as Bluetooth (registered trademark).

Communication device 85 transmits the received various signals to ECU 9. Based on the received signals, ECU 9 switches the locking state by locking devices 83 and 84.

For example, when determining that the signal transmitted from the key carried by user 65 has been received, the ECU 9 unlocks roof main body 80 and divided roof 81.

ECU 9 also receives authentication information from a not-shown server through communication device 17 in FIG. 1. The authentication information includes, for example, information indicating an authentication signal that causes release of locking by locking device 84.

When determining that communication device 85 has received the authentication signal, ECU 9 releases locking by locking device 84. As a result, for example, when a deliveryman puts a delivery object such as food into cooling box 30, the authentication signal is transmitted from a terminal used by the deliveryman to communication device 85, and thus, locking by locking device 84 can be released and the object such as food can be put into cooling box 30.

Furthermore, the deliveryman can access only cooling box 30 serving as a home delivery box, and cannot open roof main body 80. Therefore, for example, user 65 can store his/her personal items on the roof main body 80 side to thereby prevent his/her personal items from being seen by the deliveryman.

Fifth Embodiment

Figure 15:
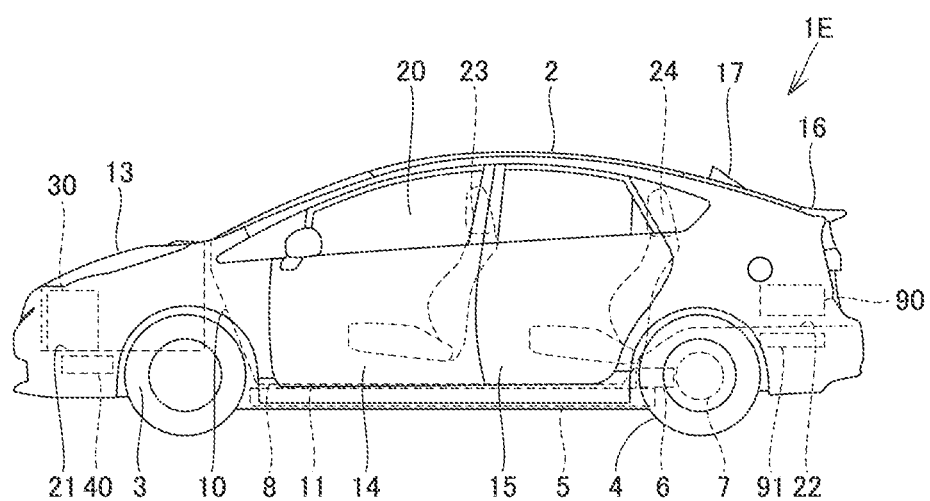
FIG. 15 is a block diagram schematically showing an electric vehicle 1E according to a fifth embodiment.

FIG. 15 is a block diagram schematically showing an electric vehicle 1E according to a fifth embodiment. Electric vehicle 1E includes a cooling box 90 provided in rear accommodation compartment 22, and a cooling circuit 91.

Cooling circuit 91 is provided separately from cooling circuit 40. By opening back hatch 16, the user can put various types of food and the like into cooling box 90.

Cooling circuit 91 is configured similarly to cooling circuit 40. Cooling circuit 91 includes a condenser, a gas-liquid separator, an expansion valve, an evaporator, a blower, a compressor, and a refrigerant pipe. Cooling circuit 91 cools air in cooling box 90.

While the embodiments of the present disclosure have been described, it should be understood that the embodiments disclosed herein are illustrative and non-restrictive in every respect. The scope of the present disclosure is defined by the terms of the claims and is intended to include any modifications within the scope and meaning equivalent to the terms of the claims.

What is claimed is:

1. An electric vehicle comprising:
    a vehicle main body; and
    a cooling box provided in the vehicle main body,
    a passenger compartment in which a passenger gets, and a front accommodation compartment provided more frontward than the passenger compartment being formed in the vehicle main body, wherein
    the cooling box is disposed in the front accommodation compartment,
    the vehicle main body includes a roof provided so as to close an upper part of the front accommodation compartment,
    the roof includes a roof main body and a divided roof and a locking device,
    the divided roof is disposed on a portion of the front accommodation compartment located above the cooling box, and
    the locking device switches between a state in which the roof main body is locked and a state in which the roof main body is unlocked.

2. The electric vehicle according to claim 1, further comprising a first front wheel and a second front wheel provided more frontward than a center of the vehicle main body and arranged each other in a width direction of the vehicle main body, wherein
    the cooling box is disposed between the first front wheel and the second front wheel.

3. The electric vehicle according to claim 1, wherein
    the cooling box is located closer to a front end of the vehicle main body than the passenger compartment.

4. The electric vehicle according to claim 1, wherein
    the cooling box is located closer to the passenger compartment than a front end of the vehicle main body, and
    a door configured to open and close the cooling box is provided on a side surface of the cooling box located on the passenger compartment side, and the door is disposed in the passenger compartment.

5. The electric vehicle according to claim 1, wherein
    the cooling box is disposed at a center in a width direction of the vehicle main body.

6. The electric vehicle according to claim 1, wherein
    the vehicle main body includes a first side surface and a second side surface arranged in a width direction, and
    the cooling box is disposed on the first side surface side with respect to a center in the width direction of the vehicle main body.

7. The electric vehicle according to claim 1, further comprising a cooling circuit configured to cool air in the passenger compartment and air in the cooling box, wherein
    when the front accommodation compartment is viewed from above in a plan view, at least a part of the cooling circuit is located in the front accommodation compartment.

8. The electric vehicle according to claim 1, further comprising a rear-side cooling box, wherein
    a rear accommodation compartment located more rearward than the passenger compartment is formed in the vehicle main body, and
    the rear-side cooling box is disposed in the rear accommodation compartment.

9. An electric vehicle comprising:
    a vehicle main body; and
    a cooling box provided in the vehicle main body,
    a passenger compartment in which a passenger gets, and a front accommodation compartment provided more frontward than the passenger compartment being formed in the vehicle main body, wherein
    the cooling box is disposed in the front accommodation compartment,
    the vehicle main body includes a roof provided so as to close an upper part of the front accommodation compartment,
    the roof includes a roof main body and a divided roof, both the roof main body and the divided roof being openable, and
    the divided roof is disposed on a portion of the front accommodation compartment located above the cooling box.

* * * * *